(12) United States Patent
Bezbaruah et al.

(10) Patent No.: US 7,694,086 B1
(45) Date of Patent: Apr. 6, 2010

(54) METHOD AND SYSTEM FOR INCREMENTAL BACKUP OF DATA VOLUMES

(75) Inventors: Angshuman Bezbaruah, Range Hills (IN); Pradip Kulkarni, Maharashtra (IN); Niranjan S. Pendharkar, Maharashtra (IN)

(73) Assignee: Symantec Operating Corporation, Mountain View, CA (US)

( * ) Notice: Subject to any disclaimer, the term of this patent is extended or adjusted under 35 U.S.C. 154(b) by 499 days.

(21) Appl. No.: 10/610,138

(22) Filed: Jun. 30, 2003

(51) Int. Cl.
*G06F 12/16* (2006.01)
*G06F 17/40* (2006.01)
(52) U.S. Cl. .................................... 711/162; 707/204
(58) Field of Classification Search ................ 711/162; 707/204
See application file for complete search history.

(56) References Cited

U.S. PATENT DOCUMENTS

| | | | | |
|---|---|---|---|---|
| 4,584,639 A | * | 4/1986 | Hardy | 726/2 |
| 6,151,685 A | * | 11/2000 | Li et al. | 714/6 |
| 6,718,447 B2 | * | 4/2004 | Cochran | 711/162 |
| 7,003,694 B1 | * | 2/2006 | Anderson et al. | 714/16 |
| 2003/0061537 A1 | * | 3/2003 | Cha et al. | 714/16 |
| 2003/0177306 A1 | * | 9/2003 | Cochran et al. | 711/114 |

OTHER PUBLICATIONS

"IEEE 100—The Authoritative Dictionary of IEEE Standards Terms," Seventh Edition, IEEE Press, 2000, p. 752.*
"Microsoft Computer Dictionary," Fifth Edition, Microsoft Press, 2002, p. 372.*
"Newton's Telecom Dictionary," CMP Books, 2004, p. 588.*
"Veritas Database Replication Option™ 2.2 for Database Edition for Oracle®," Dec. 2000, p. (i)-(iv) and 1-10.*

* cited by examiner

*Primary Examiner*—Shane M Thomas
(74) *Attorney, Agent, or Firm*—Campbell Stephenson LLP (57) ABSTRACT

A method and system for incremental backup is disclosed. The method includes attaching a first plex to a log, which includes a log plex. The method also includes writing data to said log plex and said first plex.

23 Claims, 9 Drawing Sheets

METHOD AND SYSTEM FOR INCREMENTAL BACKUP OF DATA VOLUMES

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

1. Field of the Invention

This invention relates to the field of data storage devices, and more particularly relates to a method and system for incremental backup.

2. Description of the Related Art

Information drives business. A disaster affecting a data center can cause days or even weeks of unplanned downtime and data loss that could threaten an organization's productivity. For businesses that increasingly depend on data and information for their day-to-day operations, this unplanned downtime can also hurt their reputations and bottom lines. Businesses are becoming increasingly aware of these costs and are taking measures to plan for and recover from disasters.

Two areas of concern when a failure occurs, as well as during the subsequent recovery, are preventing data loss and maintaining data consistency between primary and secondary storage areas. One simple strategy includes backing up data onto a storage medium such as a tape, with copies stored in an offsite vault. Duplicate copies of backup tapes may be stored onsite and offsite. More complex solutions include replicating data from local computer systems to backup local computer systems and/or to computer systems at remote sites.

Not only can the loss of data be critical, the failure of hardware and/or software can cause substantial disruption. In many situations, disaster recovery requires the ability to move a software application and associated data to an alternate site for an extended period, or even permanently, as a result of an event, such as a fire, that destroys a site. For these more complicated situations, strategies and products to reduce or eliminate the threat of data loss and minimize downtime in the face of a site-wide disaster are becoming increasingly available.

For example, replication facilities exist that replicate data in real time to a disaster-safe location. Data are continuously replicated from a primary node, which may correspond to a computer system in control of a storage device, to a secondary node. The nodes to which data are copied may reside in local backup clusters or in remote "failover" sites, which can take over when another site fails. Replication allows persistent availability of data at all sites.

The terms "primary node" and "secondary node" are used in the context of a particular software application, such that a primary node for one application may serve as a secondary node for another application. Similarly, a secondary node for another application may serve as a primary node for that application.

The term "application group" is used to describe both an application and the corresponding data. If a primary application group on one cluster becomes unavailable for any reason, replication enables both the application and the data to be immediately available using the secondary application group in another cluster or site.

To accommodate the variety of business needs, some replication facilities provide remote mirroring of data and replicating data over a wide area or distributed network such as the Internet. However, different types of storage typically require different replication methods. Replication facilities are available for a variety of storage solutions, such as database replication products and file system replication products, although typically a different replication facility is required for each type of storage solution.

Replication facilities provide such functionality as enabling a primary and secondary node to reverse roles when both are functioning properly. Reversing roles involves such replication operations as stopping the application controlling the replicated data, demoting the primary node to a secondary node, promoting the original secondary node to a primary node, and re-starting the application at the new primary node. Another example of functionality of a replication facility involves determining when a primary node is down, promoting the secondary node to a primary node, enabling transaction logging and starting the application that controls the replicated data on the new primary node. In addition, when the former primary node recovers from failure, the replication facility can prevent the application from starting at the former primary node since the application group is already running at the newly-promoted node, the former secondary node. The transaction log can be used to synchronize data at the former and new primary nodes.

It is also important to be able to backup replicated data, as is the case with any data. Conceptually, the backup process is relatively simple. The difficulties faced by system administrators include the following. One challenge is the impact on resources. It is obviously important to get backup done as quickly as possible. But to finish faster, data has to be copied faster, which implies greater demands on disks and input/output (I/O) channel bandwidth. But disks and channels that are busy with backup requests can't process transactions. Simply put, the more I/O resources a backup methodology uses, the slower online operations become.

Another challenge is the timing of such backup operations. In order to represent a consistent point-in-time image, backups need to be started at a time when no other activity is occurring. Thus, backups are constrained to start at times when the business impact of stopping accesses to the data is lowest. The bigger an enterprise, the more data needing backup the business is likely to possess. Because backup is very resource intensive, as noted, large enterprises invariably wish to minimize its impact on operations.

Given the foregoing, the conflicting information technology imperatives of protecting enterprise data against failures of all kinds and continuous operation/availability make backup operations (e.g., database backup) a difficult problem for administrators. On the one hand, frequent, consistent backups need to be maintained in case data recovery is necessary. But taking data out of service for backup is often not a realistic option for many installations. Even if such data didn't have to be online continuously, the I/O resource impact tends to make frequent full backups impractical. What is needed is a technique that enables backup of such data without the impact caused by a full backup operation. Moreover, such a technique should preferably take advantage of the infrastructure provided by existing recovery technologies.

SUMMARY OF THE INVENTION

The present invention provides a method and system that addresses the foregoing limitations by providing for the incremental backup of data volumes by recording log information to an additional data set, in addition to the log itself. The present invention thus implements incremental backup using the log paradigm, and can, in fact, be used in any situation in which a log is used to track changes to data for later use. By recording such log information, and then backing up that information to a secondary storage unit, the present invention allows operations that normally occur in a log environment to be used to support the incremental backup of data.

In operation, updates written to the given log are also written to another (active) data set (typically, concurrently). When an incremental backup is to be made, a new active data set begins receiving updates written to the log, and the old active data set is backed up. The new active data set is subsequently swapped out, and replaced with either the original active data set, or a data set from a pool of data sets (to which the original active data set is retired upon completion of the backup operation).

In one embodiment, a method for incremental backup is disclosed. The method includes attaching a first plex to a log. The log includes a log plex. The method also includes writing data to said log plex and said first plex. In another embodiment, a storage system is disclosed. The storage system includes an incremental backup plex.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

For a thorough understanding of the subject invention, refer to the following detailed description, including the appended claims, in connection with the above-described drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended claims.

In the following description, for purposes of explanation, numerous specific details are set forth in order to provide a thorough understanding of the invention. It will be apparent to one skilled in the art, however, that the present invention can be employed without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Introduction

The present invention provides a method and system that allows for the incremental backup of data volumes by recording log information. Logs, such as a storage replicator log (SRL), are used to maintain information regarding the changes to various kinds of data. The present invention uses this fact to implement incremental backup. By recording manageable amounts of such replication information, and then backing up that information to a secondary storage unit (e.g., a tape backup unit), the present invention allows operations that would normally occur in a log environment to be used to support the incremental backup of the system's data.

The present invention can, in fact, be used in any situation in which a log is used to track changes to data for later use (e.g., replication). This includes the examples herein as they relate to replication, but also includes systems such as RAID-5 logs, database systems that employ logging, log structured file systems and a wide array of other systems that employ logging. Thus, when writing updates to the given log, the updates are also written to another (active) data set (typically, concurrently). When an incremental backup is to be made, updates written to the log are then written to a new active data set, and the old active data set is backed up. The new active data set is subsequently swapped out, and replaced with either the original active data set, or a data set from a pool of data sets (to which the original active data set is retired upon completion of the backup operation).

In the case of an SRL, its logs are typically mirrored, since the information contained therein is of utmost importance, and so it is important that the SRL be available. Thus, rather than taking an SRL offline, the present invention employs at least two additional copies (datasets, or plexes) of the replication information stored on the SRL. Out of these plexes, only one copy is typically attached to (part of) the SRL volume at a time, whereas the other copy is (or copies are) used for actual incremental backup operations. The other, currently unused plexes remain in a "pool" for use as an active plex, for use in case of overflow of the currently active plex or other such uses, as will be discussed subsequently.

As alluded to above, the present invention operates in an environment in which data from a primary node are replicated to maintain a consistent copy of application data at a secondary node. Typically, a secondary node is remote from the physical location of the primary node and can be accessed via a network, although it is not a requirement that the secondary node be physically remote. Primary and secondary nodes may be implemented as computer systems that communicate using a communication link, typically over a network connecting the primary and secondary nodes to other nodes.

Data are replicated from a primary node, where an application program is running, to one or more secondary nodes. A set of data on the primary node, and its counterparts on the secondary nodes, make up a Replicated Data Set (RDS). The designations of primary and secondary nodes are used in the context of a particular Replicated Data Set (RDS).

A given node can serve as a primary node for one application program, and a secondary node for another application program. Furthermore, for the same application program, a given node can serve as a secondary node at one point in time, and later as a primary node to "cascade" replication of the data to other nodes connected via communication links. For example, a first replication may be made between network nodes in different cities or states, and a node in one of the cities or states can serve as the primary node for duplicating the data world-wide.

Each primary node can have more than one secondary node. As used herein, a reference to the secondary node implicitly refers to all secondary nodes associated with a given primary node. In all cases, unless noted, the same operations are performed on all secondary nodes.

Replication is unidirectional for a given set of data. Writes of data on the primary node are sent to the secondary nodes, but access to the data at the secondary nodes is typically read-only. If read/write access to a secondary set of data is required (after a primary node crash, for example), replication can be halted for that set of data. Alternatively, a snapshot of the secondary set of data can be taken, thereby avoiding the situation in which replication needs to be halted. If data are then written to storage areas on secondary nodes, a synchronization process can be performed when the primary node comes back up so that both sets of data are again identical before resuming replication of data.

Replication of data can be performed synchronously or asynchronously. With synchronous replication, an update is posted to the secondary node and acknowledged to the primary node before completing the update at the primary node. In the event of a disaster at the primary node, data can be recovered from the secondary node without any loss of data because the copies of the data at the primary and secondary nodes contain the same data. With asynchronous replication, updates to data are immediately reflected at the primary node and are persistently queued to be forwarded to each secondary node. Data at the secondary node can lag behind data at the primary node during peak update times. A decision whether to replicate data synchronously or asynchronously depends upon the nature of the application program using the data as well as numerous other factors, such as available bandwidth, network round-trip time, the number of participating servers, and the amount of data to be replicated.

The present invention includes an incremental backup facility that operates in conjunction with a replication facility. The replication facility performs the physical replication of data, and the control facility allows processing of the replicated data at the secondary node while the process of replicating data from the primary node is ongoing.

The replication and incremental backup facilities contribute to an effective disaster recovery plan. In the event that a data center is destroyed, the application data is immediately available at a remote site, and the application can be restarted at the remote site. The replication and control facilities can be used with existing applications having existing data, as well as with new applications as they are introduced.

Replication software can support synchronous and asynchronous modes of replication at the volume level. A typical synchronous mode of replication applies a write to both the primary and secondary sites, before declaring the write to be complete. The asynchronous mode of replication uses a log area of some sort to stage a write such that the write can return as soon as the data has been logged to this area. The data can later be applied asynchronously to the primary and secondary sites. Asynchronous mode of replication can use, for example, a log referred to as a storage replicator log (SRL). This log can also be used by synchronous mode of replication, so that the local write to the volume can be done asynchronously. Thus, the SRL can be made to receive the replication information, regardless of whether a synchronous or asynchronous mode is employed. A write operation using such techniques can include, for example, the following phases:

1. Write data to the SRL;
2. Send data to the secondary sites;
3. Issue the write to the data volume in the primary site;
4. Wait for acknowledgements from the synchronous secondary sites;
5. Return the write to the application; and
6. Remaining phases (e.g., local data volume write, write to asynchronous secondaries) can proceed asynchronously.

It will be appreciated that certain ones of the foregoing operations can be performed concurrently, while others can be forced to be sequential. For example, data can be sent to the secondary sites concurrently with the write being issued to the data volume in the primary site. In contrast, certain operations can be forced to be sequential. For example, such a system can be made to wait for acknowledgements from all the secondary sites (synchronous and asynchronous) before returning the write to the application.

An SRL lends itself to efficient use for incremental backup of volumes under a Replicated Volume Group (RVG). The present invention provides a way of taking onhost and offhost incremental backup of VVR volumes, by using a mirror-breakoff technique of an SRL. At the same time, sufficient care is taken to ensure that the disk heads of the SRL disks are not disturbed, thus keeping the latency of application writes unaffected.

The full backup of the volume can be taken using any standard technique, for example, the mirror-breakoff of the data volume. Whenever a snapshot (full or incremental) is taken, a checkpoint is started in the SRL. It will be appreciated that, in the more general case, the markers used in the present invention to indicate the start (and end) of updates can be any type of metadata, dynamically stored information or other mechanism capable of indicating the point in the log at which updates begin (and end). The subsequent writes to the volumes in the RVG will be tracked in the SRL. When the next incremental backup is to be performed, the checkpoint is ended. The additional (active incremental backup (IB)) SRL plex can now be split off. The extra SRL plex (not yet associated with the SRL volume) is attached to the SRL. The extra SRL plex is attached to the SRL in "noresync" mode, which ensures that the disk heads of the SRL are not disturbed. Otherwise, the system will typically attempt to synchronize this extra SRL plex, and in doing so will almost certainly disturb the disk heads of the SRL. This would impact performance by causing the breakoff to affect the latency of application writes as a result of the synchronization having changed the disk heads' position.

The active IB plex will also be marked write-only, since its contents are not fully synchronized with the other plexes of the SRL. A new checkpoint is started in the SRL and subsequent updates keep getting tracked in the SRL and the newly-added plex. The broken off SRL plex is then used to take the incremental backup of the updates between the checkpoint start and checkpoint end. This SRL plex can also be broken off to a different disk group, imported on a different host to take the incremental backup offhost. It will be appreciated that this technique can be performed using the SRL at the primary site, or the SRL one or more of the secondary sites (whether synchronous or asynchronous). Moreover, the present invention, while discussed in terms of host-based systems, can easily be implemented in other systems. Methods and systems of the present invention can be applied in any setting where a backup needs to be performed and a log is maintained for the information to be backed up. For example, logs are typically maintained in a variety of data handling systems, such as network devices, storage area network routers and the like. Obviously, such data needs to be backed up periodically. The present invention is thus applicable in all of these scenarios.

Once the backup has completed and the system is ready for the next incremental backup, the active IB plex (still in write-only mode) can then be broken off (detached). The inactive IB plex (having completed it's use for backup) can be attached to the SRL volume (in noresync mode). This process can thus continue to repeat indefinitely, allowing for ongoing incremental backup.

An Example of a Replication System Having a Control Facility

Figure 1:
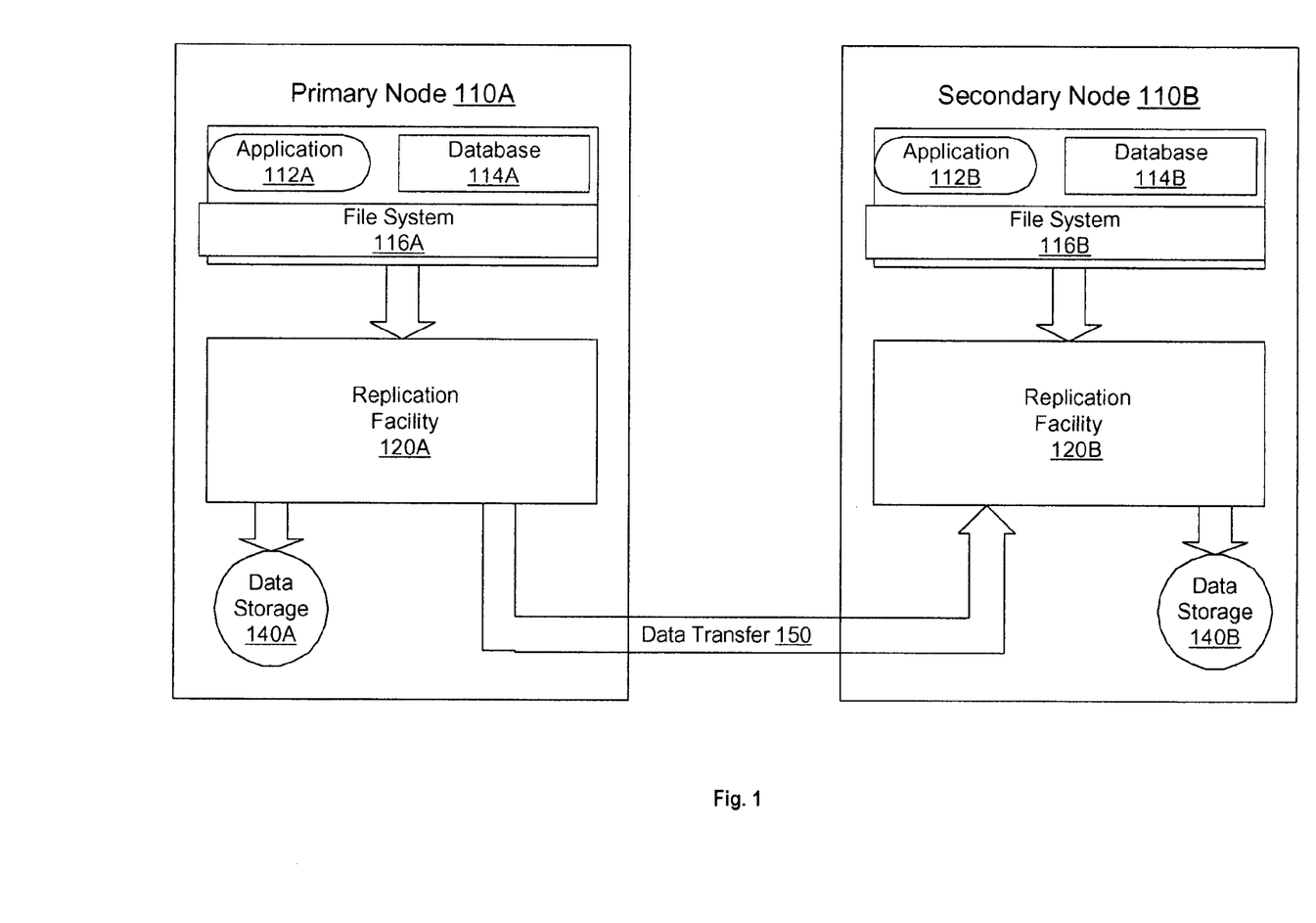
FIG. 1 shows an example of a replication system in which the present invention operates.

FIG. 1 shows an example of a replication system in which the present invention can operate. Primary node 110A includes an application program 112A, a database 114A, and a file system 116A. A replication facility 120A can obtain data from one or more of the application program 112A, database 114A, and file system 116A, and store the data in data storage 140A. Replication facility 120A transfers data from data storage 140A to data storage 140B on secondary node 110B, as shown by data transfer 150. Data transfer 150 is typically performed over a communication link between the primary and secondary nodes.

Secondary node 110B includes corresponding copies of application 112A, database 114A, and file system 116A, respectively labeled application 112B, database 114B, and file system 116B. These respective copies can perform the functions of primary node 110A in the event of disaster. Alternatively, programs and other files associated with the application, database and file system may be stored in a data storage area on the primary node and replicated along with the data. Should the secondary node itself need to replicate data, the programs and other files can be extracted from the data at the secondary node. A corresponding copy of replication facility 120A also resides on secondary node 110B, and appears there as a replication facility 120B. These copies enable secondary node 110B to perform functions similar to those performed at primary node 110A and to replicate data to its own secondary node.

Figure 2:
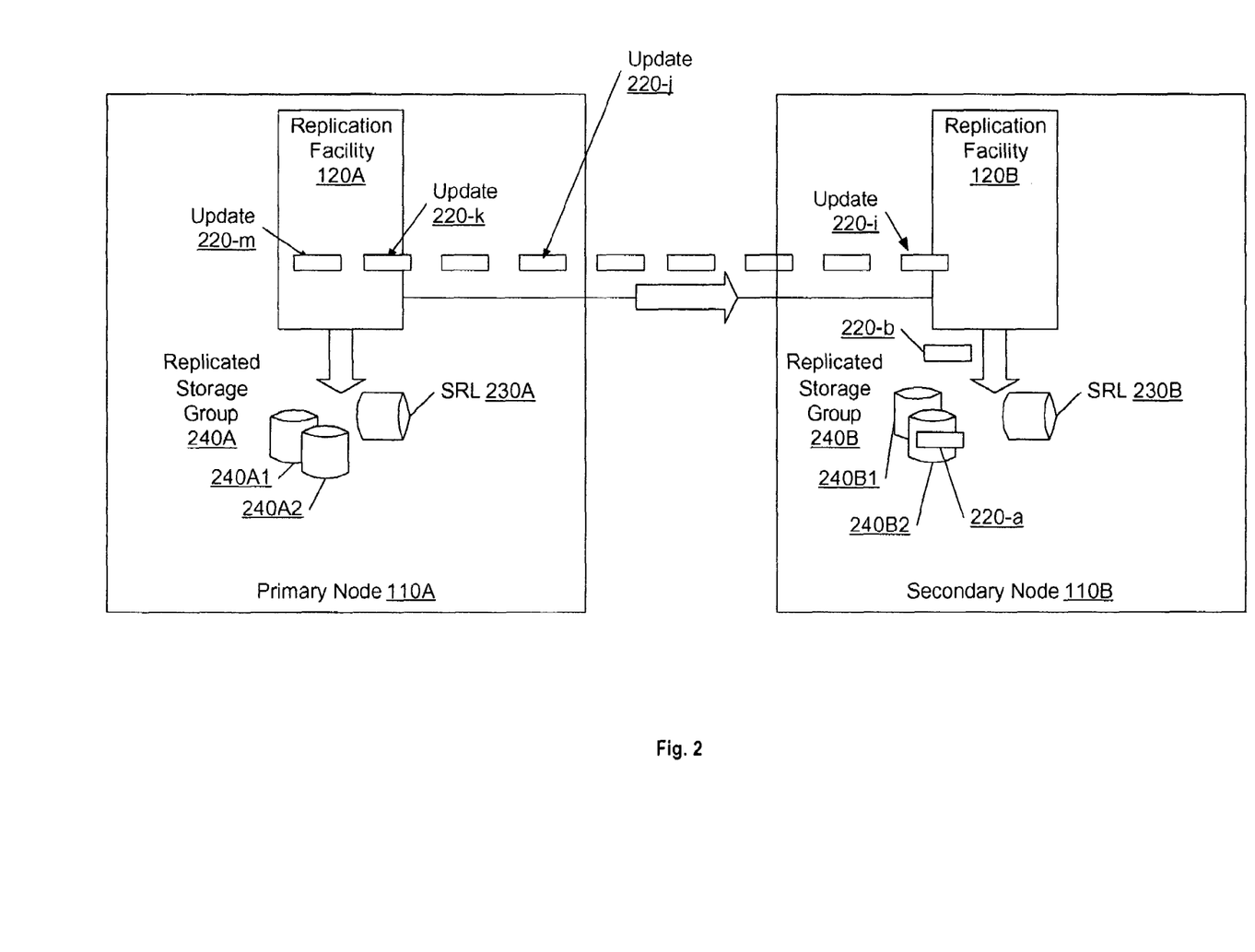
FIG. 2 shows replication of a data stream from the primary node to the secondary node of the replication system of FIG. 1.

FIG. 2 shows replication of a data stream from primary node 110A to secondary node 110B. The data stream includes multiple data units, each referred to as an update and labeled as update 220-*a*, update 220-*b*, and so on. Replication of the data stream begins when replication facility 120A of primary node 110A sends an update such as update 220-*a* to secondary node 110B. Replication of the data stream is completed when replication facility 120B of secondary node 110B stores the last update, such as update 220-*k*, on the secondary node.

Each of primary node 110A and secondary node 110B includes one or more data storage areas on which data being replicated are stored. In the example of FIG. 2, these data storage areas are storage areas 240A1 and 240A2 of primary node 110A and storage areas 240B1 and 240B2 of secondary node 110B. FIG. 2 shows a point in time during replication when update 220-*a* is being stored on the secondary node in data storage area 240B2. Replication facility 120B receives and processes the replication stream from primary node 110A and may also replicate its data for other secondary nodes.

Replication Storage Groups

A set of data storage areas that are replicated as a unit is referred to herein as a replicated storage group (RSG), such as replication storage group 240A of FIG. 2. Storage areas in a replicated storage group are under the control of an application, such as application 112A or database 114A of FIG. 1, that requires write-order fidelity among the updates to the storage areas. An application such as application 112A of FIG. 1 manages data in a primary replication storage group, such as RSG 240A. Replication facility 120A then replicates the data to one or more secondary replication storage groups, such as secondary RSG 240B, at secondary nodes. Write ordering is strictly maintained within a replication storage group during replication to ensure that each remote storage area is always consistent, both internally and with all other storage areas of the replication storage group. Storage areas that are associated with a replication storage group and contain application data are called application data storage areas.

Storage Replicator Log

In the embodiment shown in FIG. 2, each of primary node 110A and secondary node 110B also includes a storage replication log (SRL), such as SRL 230A and SRL 230B, for each replication storage group, respectively RSG 240A and RSG 240B. Updates to the data storage areas in the primary replication storage group 240A can be held in the storage replication log 230A on primary node 110A before being sent to secondary node 110B. In such an embodiment, each update to data in a replication storage group generates two write requests: one to a data storage area, and one to the storage replication log. For this reason, data storage areas and SRL storage areas are preferably configured on different physical disks to improve performance of the replication process. While the given ordering of operations is applicable to the present example, this ordering is not mandatory, and so need not be followed in all implementations of the present invention.

In some embodiments, an SRL on a secondary node, such as SRL 230B on secondary node 110B, performs a different function than the function performed by the corresponding SRL of the primary node, here SRL 230A. Under normal operations, the secondary SRL is not used. However, when the replication system is recovering after a temporary failure in communication between the primary and secondary nodes or from a primary or secondary node failure, updates can be stored in the secondary SRL and applied together to maintain data consistency. Using the secondary SRL in this way ensures that the secondary node transitions from one consistent data state to another.

In an alternative embodiment, the secondary SRL, such as SRL 230B on secondary node 110B, can be used as the first data storage area during replication. For example, data received at the secondary node may be written first to the secondary SRL and then copied to data storage areas such as replication storage group 240B. In such an embodiment, a freeze of data on the secondary node temporarily suspends copying of the data to the data storage areas. Such an embodiment can be used, for example, to perform delayed replication. It will be noted that embodiments of the present invention can be used in such a scenario to take remote incremental backups, despite the interruption in the copying of the data.

Communication Links

In an object-oriented embodiment of the invention, communication links between the primary and secondary nodes can be represented as communication link objects (not shown in FIG. 2). Communication link objects can be associated with replication storage groups. Each communication link object on a primary replication storage group, such as RSG 240A, represents the communication link from the primary replication storage group to a corresponding secondary replication storage group, such as RSG 240B. A communication link object on a secondary replication storage group represents the communication link from the secondary replication storage group to the corresponding primary replication storage group. A secondary node typically serves as a replication node for only one primary and typically has one associated communication link object referencing its primary node. However, this need not be the case—in fact, a secondary node can serve as such for a number of primary nodes. A primary replication storage group can have one or more associated communication link objects for its secondary nodes. If a secondary node is "promoted" to assume the role of a primary node, then the newly-promoted node can have multiple communication link objects for other nodes that were previously secondary to the "demoted" primary node.

A primary communication link object reads data from the corresponding storage replication log (SRL) at the primary node and sends the data to the secondary node. Communication link objects in an replication storage group share the SRL at the primary node, and each communication link object reads data at its own rate. An update is removed from the SRL when all the communication link objects have successfully sent their respective updates to the secondary nodes, and those secondaries have acknowledged the update.

As mentioned above, replication of data can be performed in synchronous or asynchronous mode. The mode of replication can be set up for each communication link object, depending on the requirements for the specific application. Communication link objects in a replication storage group can be set to replicate in different modes. It will be appreciated that, in fact, other replication modes can be used with the present invention. For example, updates can be buffered and sent to the SRL periodically. As discussed earlier, it will be noted that, while the examples provided herein are in terms of host-based implementations, techniques according to the present invention are applicable to a variety of scenarios (e.g., network devices, storage area network routers and the like). Further, the primary node and secondary node need not be of the same type. For example, the primary node might be a storage area network router, while a secondary node might simply be a computer system.

Example Processes for Incremental Backup

Figure 3A:
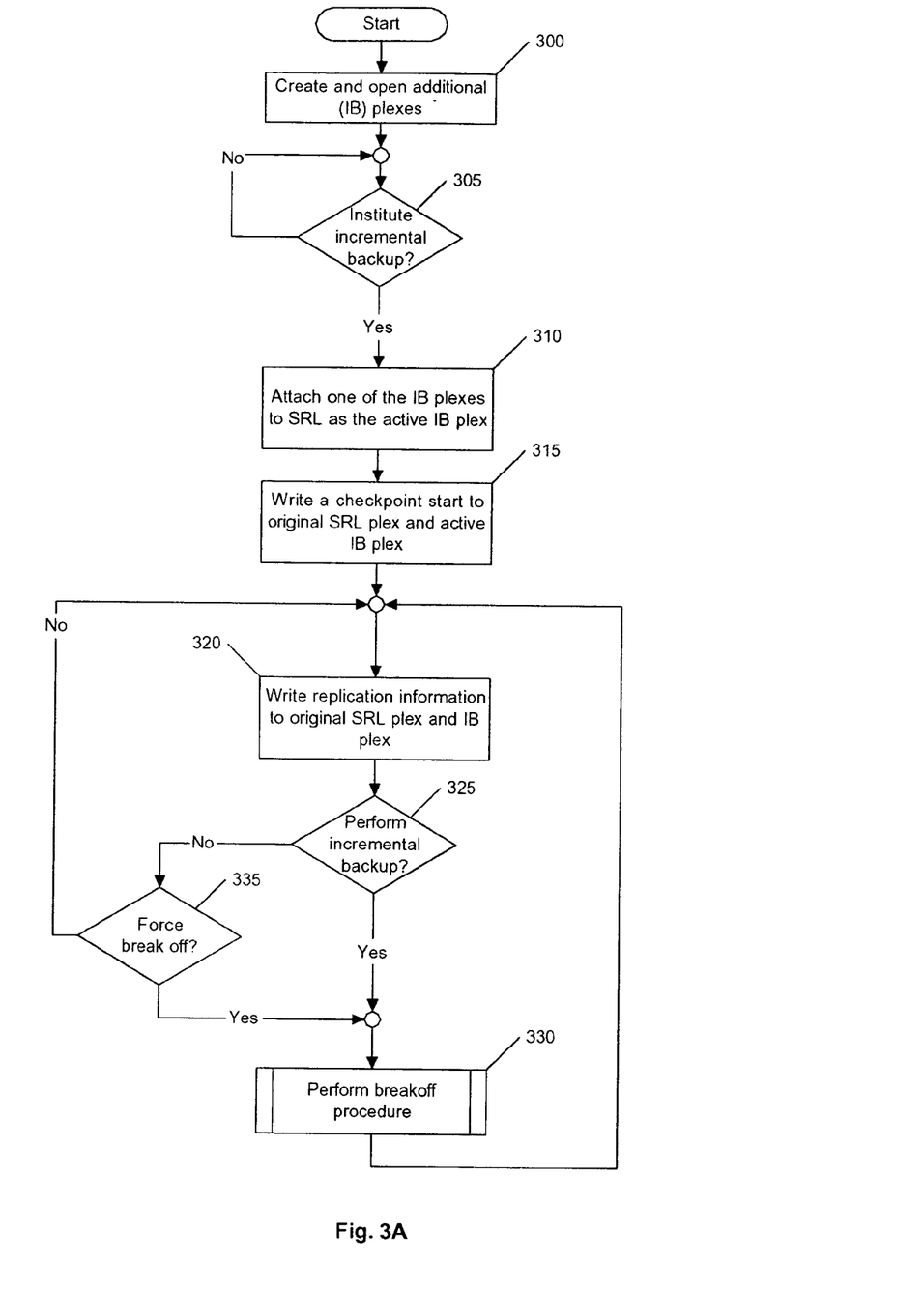
FIG. 3A is a flow diagram illustrating a process of incremental backup according to embodiments of the present invention.

FIG. 3A is a flow diagram illustrating a process of incremental backup according to embodiments of the present invention. The process begins with the creation and opening of additional plexes (step 300). Such plexes are in addition to the original SRL plex and are referred to herein as incremental backup (IB) plexes. These IB plexes are datasets that are available for reading and writing in the same manner as the original SRL plex. When attached to the SRL, the writes to the original SRL plex are also made to the currently-attached IB plex, allowing that plex to record the same information written to the original SRL plex. Once the IB plexes are created and opened, they are available for use in an incremental backup system according to the present invention, once such an incremental backup is pressed into service (step 305).

Once incremental backup is put into operation, one of the IB plexes is attached to the SRL, as the active IB plex (step 310). The active IB plex is the IB plex that is written to in parallel with the original SRL plex, with the same log information being written to each. Once the IB plex has been attached, a checkpoint is written to both the original SRL plex and the active IB plex (step 315). Replication information is then written to the original SRL plex and the active IB plex (step 320).

Periodically (e.g., on a timed basis or by some other measure), a determination is made as to whether an incremental backup should be made (step 325). This decision is typically made by the software controlling the backup process. If an incremental backup is to be made, a breakoff procedure is performed, in which the active IB plex is disconnected from the SRL, and another IB plex is attached to the SRL (and so made active) (step 330). It will be noted that the decision to break off the active IB plex can be made by the backup application or as a result of the active IB plex being full (i.e., an impending overflow condition). In the latter case, where a pool of IB plexes is implemented, the currently-active IB plex is broken off, and a selected one of the IB plexes from the IB plex pool is attached to the SRL, as discussed subsequently herein. These operations can be performed despite the fact that backup of the IB plex active prior to the currently-active IB plex has not completed (i.e., the currently-active IB plex can be broken off prior to completion of the prior active IB plex's backup). Alternatively, if an incremental backup is not yet required, a determination is made as to whether a breakoff will be forced (e.g., when the active IB plex is full (i.e., about to overflow, as noted), at a user's command, when the SRL is being taken offline, or the like) (step 335). Once it is determined that the current active IB plex will remain so, or a breakoff procedure is performed, the system continues writing replication information to the SRL (the original SRL plex and the active IB plex) (step 320).

Figure 3B:
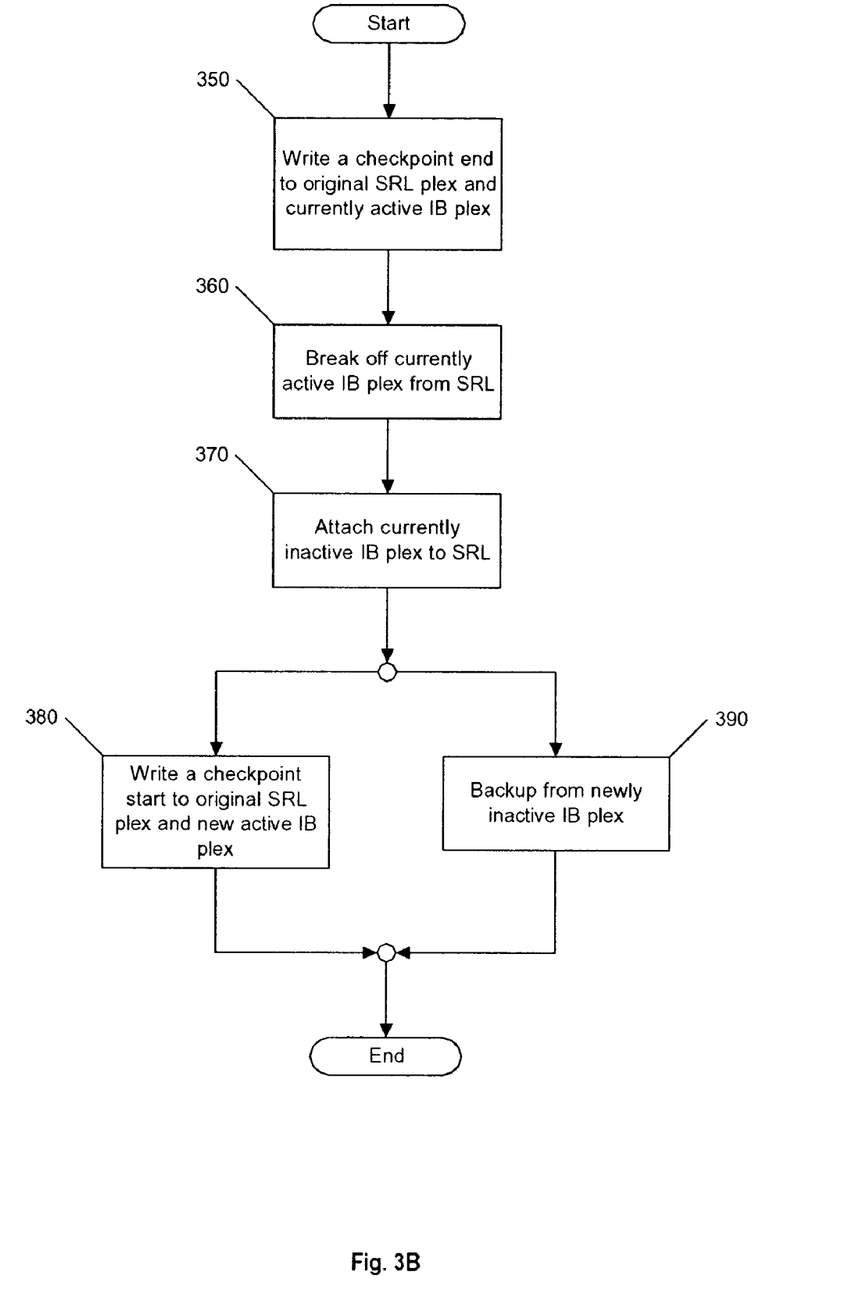
FIG. 3B is a flow diagram illustrating a process for breaking off a plex according to embodiments of the present invention.

FIG. 3B is a flow diagram illustrating a process for breaking off a plex according to embodiments of the present invention. First, a checkpoint end is written to the original SRL plex and currently-active IB plex (step 350). The updates (writes in the IB plex) between checkpoint start and end marks the extent of the log information that is to be backed up. Next, the currently-active IB plex is broken off from the SRL (step 360). This detaches the currently-active IB plex from the SRL, making the information on the now-broken off IB plex available for backup purposes. To replace the now-broken off IB plex, a currently inactive IB plex is attached to the SRL (step 370). This IB plex is now active, and available for writing, along with the original SRL plex. In fact, the next action is to write a checkpoint start to the original SRL plex and the newly-active IB plex (step 380). At this time, backup operations can be performed using the newly-inactive IB plex, as discussed subsequently (step 390).

It will be noted that various processes according to embodiments of the present invention are discussed herein (e.g., with reference to FIGS. 3A and 3B). It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

These operations may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

The software modules described herein may be received by a computer system, for example, from computer readable storage media. The computer readable storage media may be permanently, removably or remotely coupled to the computer system. Such computer readable storage media can include, for example: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; volatile storage media including registers, buffers or caches, main memory, RAM, and the like. In a UNIX-based embodiment, the software modules may be embodied in a file which may be a device, a terminal, a local or remote file, a socket, a network connection, a signal, or other expedient of communication or state change. Other new and various types of computer-readable storage media can be used to store and/or transmit the software modules discussed herein.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the processes described herein can be executed by a module (e.g., a software module) or a portion of a module or a computer system user using, for example, a computer system such as that discussed subsequently.

An Incremental Backup Example

Figure 4A:
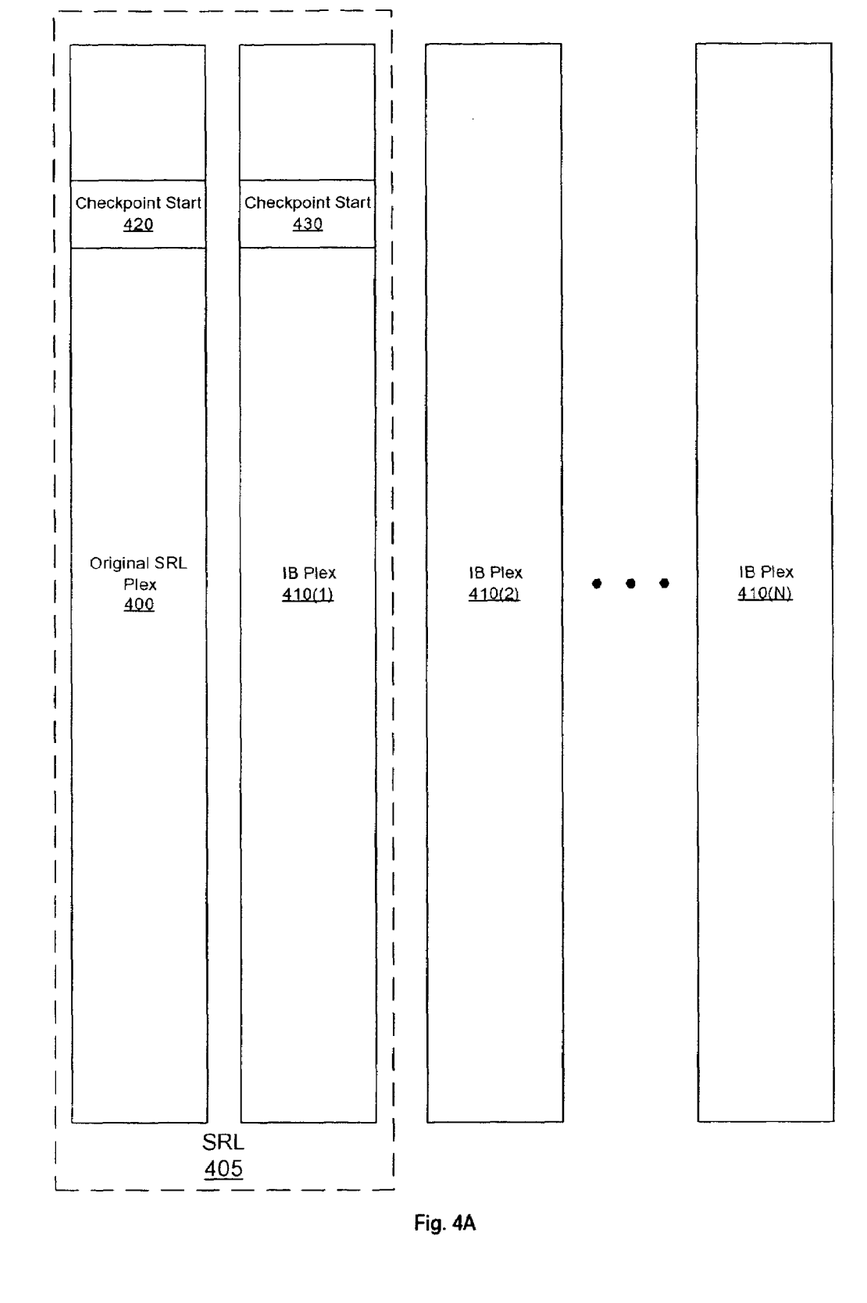
FIG. 4A is a diagram illustrating a stage in an example process of the present invention.

FIG. 4A is a diagram illustrating a stage in an example process of the present invention. At this stage (representative of steps 300-315 of FIG. 3A having been performed), an original SRL plex 400 of a storage replicator log (SRL) 405 and one of a number of IB plexes 410(1)-(N) (IB plex 410(1)) have had a checkpoint start 420 and a checkpoint start 430 written to them, respectively, and are ready to begin having replication information written to them (as in step 320 of FIG. 3A). Original SRL plex 400 is included in SRL 405, while IB plex 410(1) has been attached to SRL 405. As will be apparent to one of skill in the art, also at this stage, IB plexes 410(1)-(N) have been created and opened, IB plex 410(1) has been made the active IB plex, and original SRL plex 400 and IB plex 410(1) have had checkpoints written to them (checkpoint starts 420 and 430). As will be apparent, IB plex 410(1) need not have been selected as the first IB plex to be made active, but was made so out of convenience. As is also apparent, the number of IB plexes available for use as the active IB plex is flexible, and is based on the amount of storage available for use as IB plexes, the number of incremental backup operations that can be performed at once, and other such considerations.

Figure 4B:
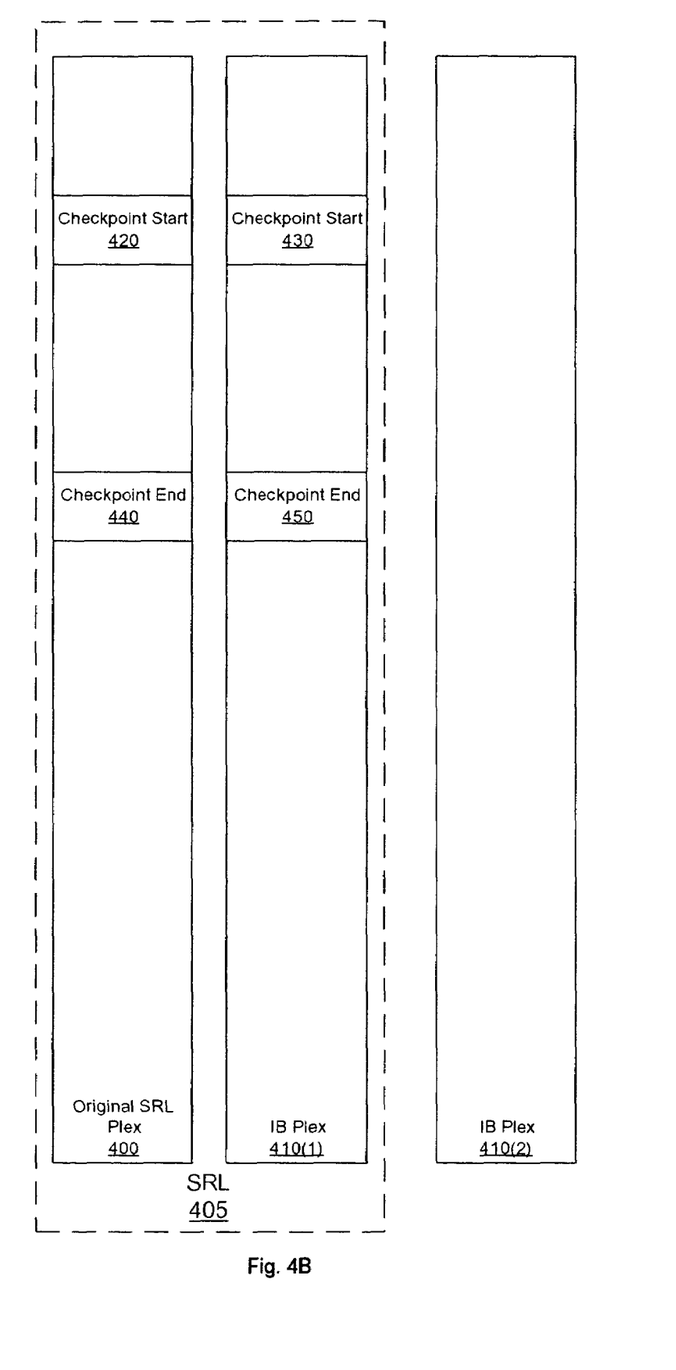
FIG. 4B is a diagram illustrating a later stage in an example process of the present invention.
Figure 4C:
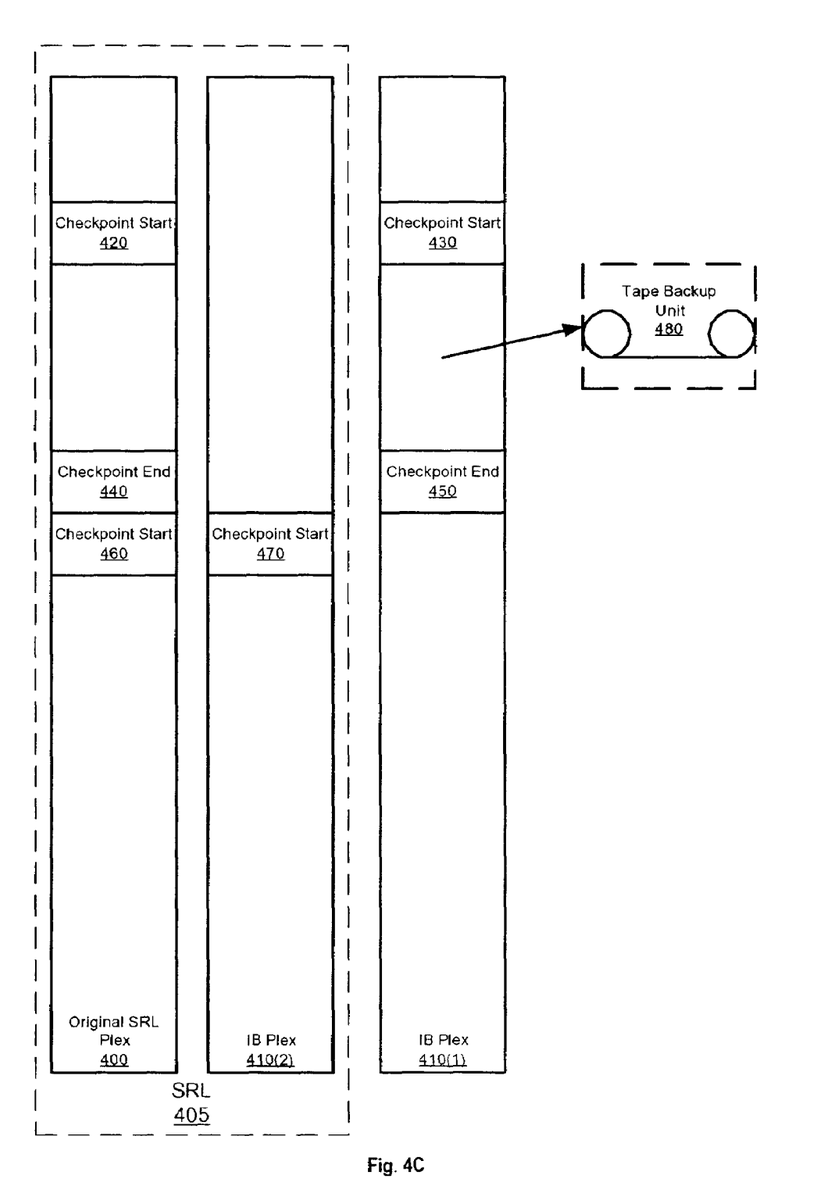
FIG. 4C is a diagram illustrating a still later stage in an example process of the present invention.

FIG. 4B is a diagram illustrating a later stage in an example process of the present invention. For simplicity, only original SRL plex 400, IB plex 410(1) and IB plex 410(2) are shown in FIGS. 4B and 4C, because (in this example) these plexes are the only plexes involved in the incremental backup procedure. As before, checkpoint starts 420 and 430 have been written to original SRL plex 400 and IB plex 410(1). In FIG. 4B, however, a determination has been made that IB plex 410(1) should be broken off, and the replication information written to IB plex 410(1) backed up (corresponding to steps 325-330 of FIG. 3A). In that vein, a checkpoint end 440 is written to original SRL plex 400, and a checkpoint end 450 is written to IB plex 410(1). This ends the writing of replication information to these plexes during this incremental backup cycle.

FIG. 4C is a diagram illustrating a still later stage in an example process of the present invention. At this stage, IB plex 410(2) has been attached to SRL 405, and a checkpoint start 460 written to original SRL plex 400, and a checkpoint start 470 written to IB plex 410(2). Original SRL plex 400 and IB plex 410(2) are now ready to have replication information written to them. Also at this stage, IB plex 410(1) has been detached from (broken off of) SRL 405, and the replication information between checkpoint start 430 and checkpoint end 450 is now available for backup, using a tape backup unit 480, for example. As noted earlier, such a backup operation can be performed for a number of IB plexes concurrently, given the requisite equipment, allowing a balance to be struck between the frequency with which the break off operation is performed, and the amount of data held by the active IB plex (and so at risk of loss).

It will be noted that the volumes in a replicated volume group (RVG) are logically related. These volumes might be used by the same application (e.g., a database system). A technique according to the present invention can be used to obtain the incremental changes in the entire RVG. This is because the SRL is shared by all the volumes in an RVG and hence all the updates (writes) to the RVG are recorded in the SRL and so in the active IB plex, making those updates available for incremental backup. A technique according to the present invention thus makes it possible to incrementally backup of an RVG.

Alternatively, a technique according to the present invention can also be used to backup individual volumes or a subset of the volumes in an RVG. In such a case, because updates made to the RVG (and so logged to the SRL (and active IB plex)) are identified as to which volume the update pertains, those updates can be identified during the backup of the IB plex and only selected ones of those updates (based on their volume identifier) backed up. This allows only selected volumes to be backed up (using their volume identifiers). It will be appreciated that this selection process can be pushed up to the level of writing the updates to the active IB plex, in which case, although all updates are written to the original SRL plex, only the updates of interest are written to the active IB plex. This provides several benefits, including reducing the possibility of overflow of the active IB plex and speeding writes to the SRL volume (avoiding unnecessary writes, thus more efficiently using system resources).

In general, then, the logging of updates to any group of objects can be selectively backed up, so long as the updates for those selected objects can be separately identified as such. Thus, incremental backups can be selectively made based upon volume identifier, file identifier, date/time information or other such identifying information. For example, selective incremental backup can be implemented in a log-structured filesystem. In such a scenario, while a user might want the entire filesystem incrementally backed up, the user might otherwise desire to backup only certain files, blocks, directory trees, or the like. In fact, a number of criteria can be specified to restrict the data to be incrementally backed up (e.g., only specified volumes, and then, only after a specified date/time).

If there are too many updates (e.g., in the situation where an RVG is being incrementally backed up), the log pointer can come around the end of the SRL and overwrite the checkpoint start. This will interfere with incremental backup. In such a scenario, one alternative is to have the system resort to full backup (rather than incremental backups). Alternatively, a bitmap can be used to track the changed blocks, with the bitmap populated with the SRL contents after the checkpoint start.

Alternatively, as noted, a breakoff of the currently-active IB plex can be forced (e.g., as here, in the case of a potential overflow). This can be accomplished, for example, by writing checkpoint ends to the original SRL plex and currently-active IB plex, and detaching the currently-active IB plex. At this point, a new active IB plex is attached to the SRL, and a checkpoint start written to the newly-active IB plex. Replication information can then continue to be written (although to the new active IB plex). Backup of the old IB plex can then proceed (or, in the case of a pooled arrangement, the old IB plex can await backup of its data).

An Example Computing and Network Environment

Figure 5:
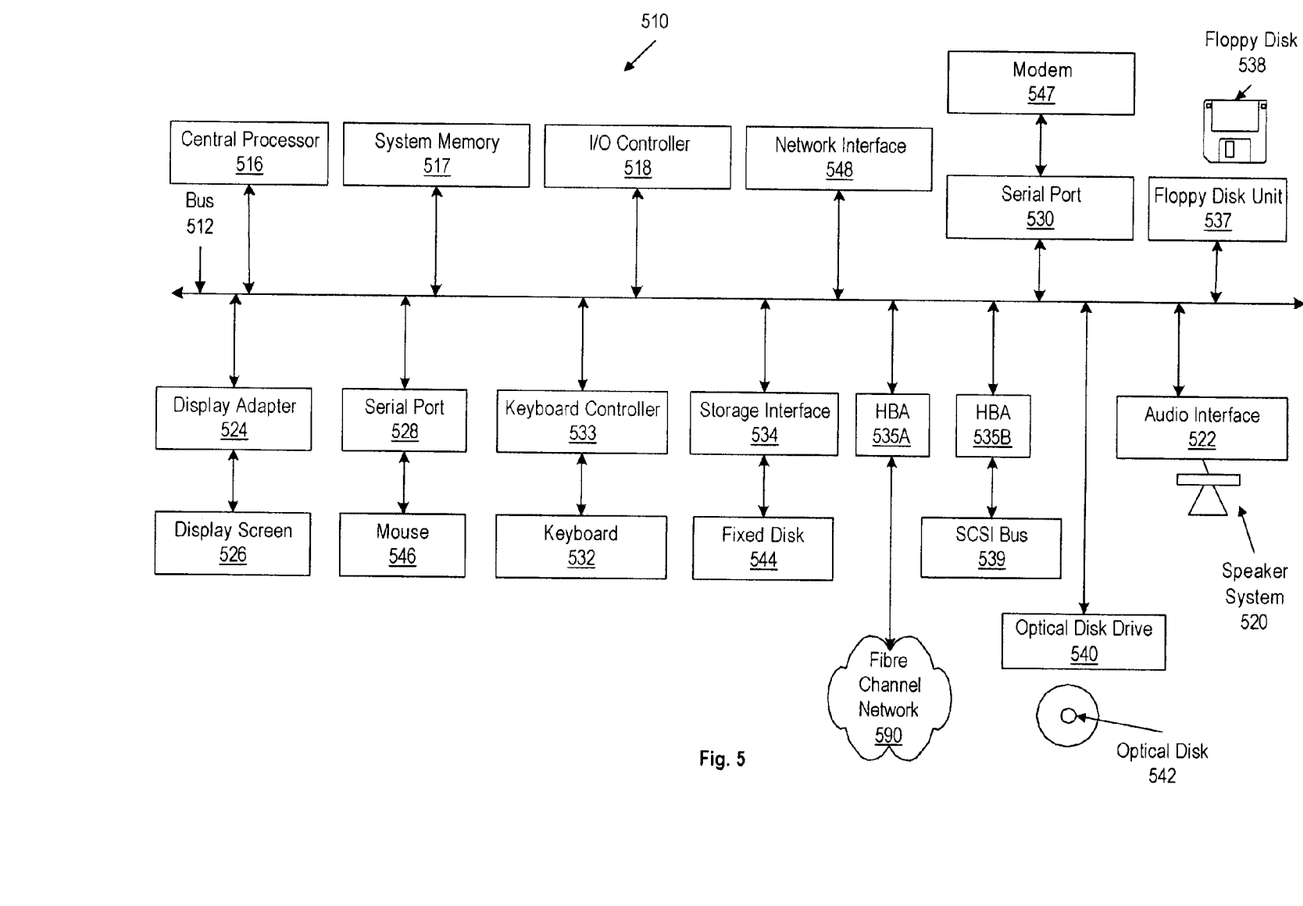
FIG. 5 is a block diagram illustrating an example computer system suitable for implementing the present invention.

FIG. 5 depicts a block diagram of a computer system 510 suitable for implementing a virtual loader according to the present invention. Computer system 510 includes a bus 512 which interconnects major subsystems of computer system 510, such as a central processor 516, a system memory 517 (typically RAM, but which may also include ROM, flash RAM, or the like), an input/output (I/O) controller 518, an external audio device, such as a speaker system 520 via an audio output interface 522, an external device, such as a display screen 524 via display adapter 526, serial ports 528 and 530, a keyboard 532 (interfaced with a keyboard controller 533), a storage interface 534, a floppy disk unit 537 operative to receive a floppy disk 538, a host bus adapter (HBA) interface card 535A operative to connect with a fibre channel network 590, a host bus adapter (HBA) interface card 535B operative to connect to a SCSI bus 539, and an optical disk drive 540 operative to receive an optical disk 542. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 516 and system memory 517, which may include read-only memory (ROM) or flash memory (neither shown), and random access memory (RAM) (not shown), as previously noted. The RAM is generally the main memory into which the operating system and application programs are loaded and typically affords at least 64 megabytes of memory space. The ROM or flash memory may contain, among other code, the Basic Input-Output system (BIOS) which controls basic hardware operation such as the interaction with peripheral components. Applications resident with computer system 510 are generally stored on and accessed via a computer readable medium, such as a hard disk drive (e.g., a fixed disk 544), an optical drive (e.g., optical disk drive 540), floppy disk unit 537 or other storage medium. Additionally, applications may be in the form of electronic signals modulated in accordance with the application and data communication technology when accessed via network modem 547 or network interface 548.

Storage interface 534, as with the other storage interfaces of computer system 510, may connect to a standard computer readable medium for storage and/or retrieval of information, such as fixed disk drive 544. Fixed disk drive 544 may be a part of computer system 510 or may be separate and accessed through other interface systems. It will be apparent that a virtual loader of the present invention can be implemented, for example, using a hard disk drive such as fixed disk 544. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 5 to be present to practice the present invention. The devices and subsystems may be interconnected in different ways from that shown in FIG. 5. The operation of a computer system such as that shown in FIG. 5 is readily known in the art and is not discussed in detail in this application. Code to implement the present invention may be stored in computer-readable storage media such as one or more of system memory 517, fixed disk 544, optical disk 542, or floppy disk 538. Additionally, computer system 510 may be any kind of computing device, and so includes personal data assistants (PDAs), network appliance, X-window terminal or other such computing devices. The operating system provided on computer system 510 may be MS-DOS®, MS-WINDOWS®, OS/2®, UNIX®, Linux®, or another known operating system. Computer system 510 also supports a number of Internet access tools, including, for example, an HTTP-compliant web browser having a JavaScript interpreter, such as Netscape Navigator®, Microsoft Explorer®, and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 510). It is to be understood that such depicted architectures are merely examples, and that, in fact, many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Figure 6:
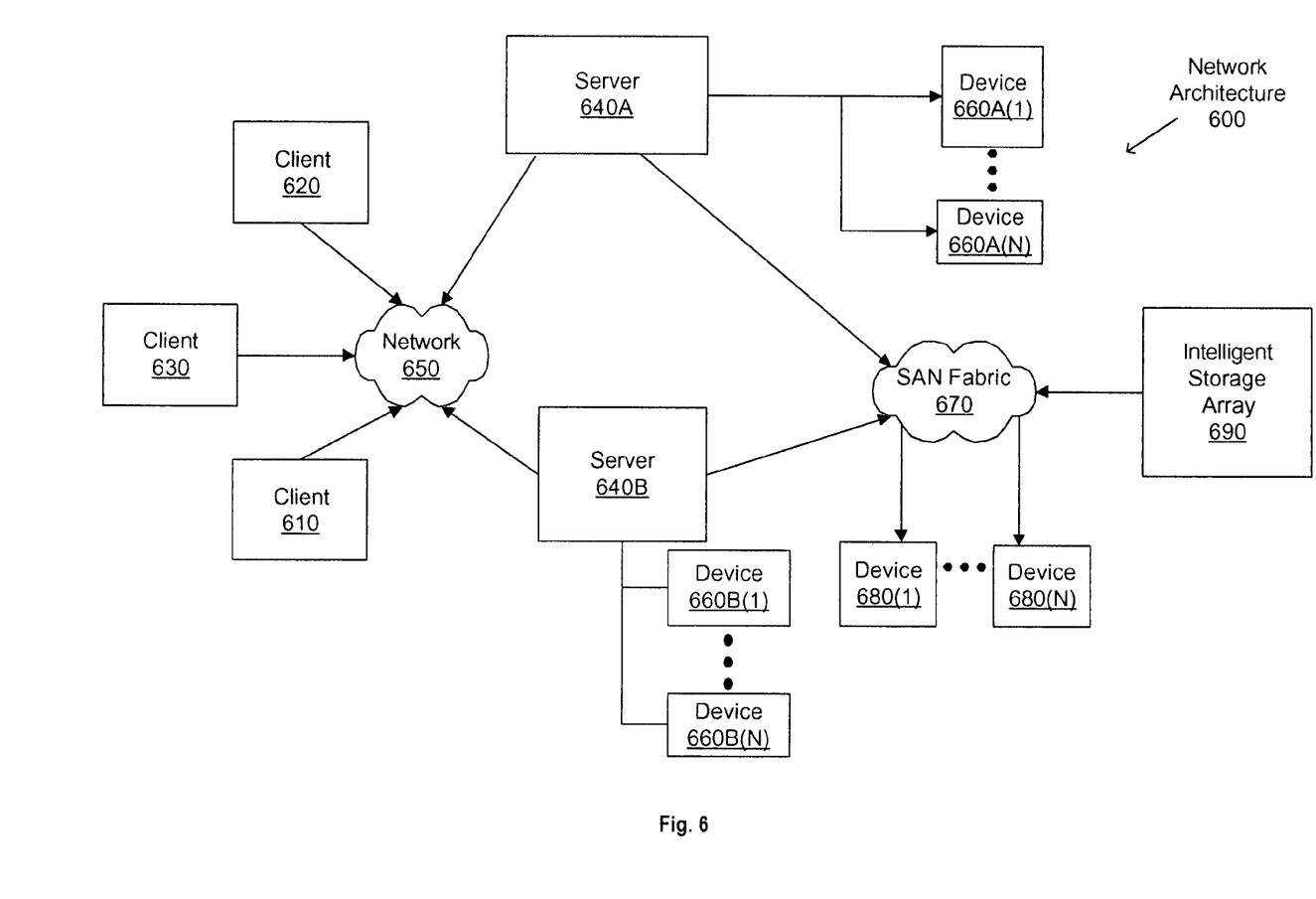
FIG. 6 is a block diagram illustrating a network architecture suitable for implementing the present invention.

FIG. 6 is a block diagram depicting a network architecture 600 in which client systems 610, 620 and 630, as well as storage servers 640A and 640B (any of which can be implemented using a computer system such as computer system 510), are coupled to a network 650. Storage server 640A is further depicted as having storage devices 660A(1)-(N) directly attached, and storage server 640B is depicted with storage devices 660B(1)-(N) directly attached. Storage servers 640A and 640B are also connected to a SAN fabric 670, although connection to a storage area network is not required for operation of the invention. SAN fabric 670 supports access to storage devices 680(1)-(N) by storage servers 640A and 640B, and so by client systems 610, 620 and 630 via network 650. Intelligent storage array 690 is also shown as an example of a specific storage device accessible via SAN fabric 670. As will be apparent, a virtual loader of the present invention can also be implemented, for example, using one or more storage devices such as storage devices 660A(1)-(N), storage devices 660B(1)-(N) or storage devices 680(1)-(N) (via SAN fabric 670).

It will be noted that the variable identifier "N" is used in several instances in FIG. 6 to more simply designate the final element of a series of related or similar elements. The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

With reference to computer system 510, modem 547, network interface 548 or some other method can be used to provide connectivity from each of client computer systems 610, 620 and 630 to network 650. Client systems 610, 620 and 630 are able to access information on storage server 640A or 640B using, for example, a web browser or other client software (not shown). Such a client allows client systems 610, 620 and 630 to access data hosted by storage server 640A and 640B or one of storage devices 660A(1)-(N), 660B(1)-(N), 680(1)-(N) or intelligent storage array 690. FIG. 6 depicts the use of a network such as the Internet for exchanging data, but the present invention is not limited to the Internet or any particular network-based environment.

While particular embodiments of the present invention have been shown and described, it will be apparent to those skilled in the art that, based upon the teachings herein, changes and modifications may be made without departing from this invention and its broader aspects and, therefore, the appended claims are to encompass within their scope all such changes and modifications as are within the true scope of this invention. Moreover, while the invention has been particularly shown and described with reference to these specific embodiments, it will be understood by those skilled in the art that the foregoing and other changes in the form and details may be made therein without departing from the scope of the invention.

What is claimed is:

1. A method comprising:
   attaching a first plex to a log, wherein
      said log comprises a log plex, and
      said log is a storage replicator log(SRL);
   writing a checkpoint start to said log plex and to said first plex;
   writing first data to said log plex;
   writing said first data to said first plex, wherein
      said writing said first data to said log plex and said writing said first data to said first plex are performed concurrently;
   writing a checkpoint end to said log plex and to said first plex;
   detaching said first plex from said log;
   writing second data to said log plex, wherein
      said writing said second data to said log plex is performed after said detaching; and
   backing up data stored between said checkpoint start and said checkpoint end in said first plex.

2. The method of claim 1, wherein
   said first plex is attached to said log in a mode that does not cause a resynchronization operation to be performed on said first plex.

3. The method of claim 1, wherein said backing up said data stored between said checkpoint start and said checkpoint end in said first plex comprises:
   copying said data stored between said checkpoint start and said checkpoint end in said first plex to a storage unit.

4. The method of claim 1, further comprising:
   attaching a second plex to said log in response to said detaching said first plex from said log; and
   writing said second data to said second plex, wherein
      said writing said second data to said second plex is performed concurrently with said writing said second data to said log plex.

5. The method of claim 4, wherein
   said first and said second plexes are incremental backup plexes.

6. The method of claim 4, further comprising:
   detaching said second plex from said log; and
   attaching said first plex to said log in response to said detaching said second plex from said log.

7. The method of claim 6, further comprising:
   backing up data stored in said second plex.

8. The method of claim 1, wherein
   retrieving said first plex from a storage pool; and
   in response to said backing up, returning said first plex to the storage pool.

9. A computer system comprising:
   a processor;
   computer readable medium coupled to said processor; and computer code, encoded in said computer readable medium, configured to cause said processor to:
attach a first plex to a log, wherein
said log comprises a log plex, and
said log is a storage replicator log (SRL);
write a checkpoint start to said log plex and to said first plex;
write first data to said log plex;
write said first data to said first plex, wherein
writing said first data to said log plex and writing said first data to said first plex are performed concurrently;
write a checkpoint end to said log plex and to said first plex;
detach said first plex from said log;
writing second data to said log plex, wherein
said writing said second data to said log plex is performed after said detaching; and
backup data stored between said checkpoint start and said checkpoint end in said first plex.

10. The computer system of claim 9, wherein said computer code configured to cause said processor to attach said first plex to said log is further configured to cause said processor to:
attach said first plex to said log in a mode that does not cause a resynchronization operation to be performed on said first plex.

11. The computer system of claim 9, further comprising:
a storage unit, coupled to said processor, wherein said computer code configured to cause said processor to backup data stored in said first plex is further configured to cause said processor to:
copy said data stored in said first plex to a storage unit.

12. The computer system of claim 9, wherein said computer code is further configured to cause said processor to:
attach a second plex to said log in response to said first plex being detached from said log; and
write said second data to said second plex, wherein
said writing said second data to said second plex is performed concurrently with said writing said second data to said log plex.

13. The computer system of claim 12, wherein said computer code is further configured to cause said processor to:
detach said second plex from said log; and
attach said first plex to said log in response to said second plex being detached from said log.

14. A computer program product comprising:
a first set of instructions, executable on a computer system, configured to attach a first plex to a log, wherein
said log comprises a log plex, and
said log is a storage replicator log (SRL);
a second set of instructions, executable on said computer system, configured to
write a checkpoint start to said log plex and to said first plex,
write first data to said log plex,
write said first data to said first plex, wherein
writing said first data to said log plex and writing said first data to said first plex are performed concurrently;
write data to said log plex, configured to write said data to said first plex, and
write a checkpoint end to said log plex and to said first plex;
a third set of instructions, executable on said computer system, configured to detach said first plex from said log;
a fourth set of instructions, executable on said computer system, configured to write second data to said log plex, wherein
said fourth set of instructions are executed by said computer system after said second set of instructions are executed by said computer system;
a fifth set of instructions, executable on said computer system, configured to backup data stored between said checkpoint start and said checkpoint end in said first plex; and
computer readable storage media, wherein said computer program product is encoded in said computer readable storage media.

15. The computer program product of claim 14, wherein said first set of instructions comprises:
a first subset of instructions, executable on said computer system, configured to attach said first plex to said log in a mode that does not cause a resynchronization operation to be performed on said first plex.

16. The computer program product of claim 14, wherein said second set of instructions comprises:
a first subset of instructions, executable on said computer system, configured to write only a selected portion of said data to said first plex.

17. The computer program product of claim 14, further comprising:
a sixth set of instructions, executable on said computer system, configured to attach a second plex to said log in response to said first plex being detached from said log; and
a seventh set of instructions, executable on said computer system, configured to concurrently write said second data to said log plex and said second plex.

18. The computer program product of claim 17, further comprising:
a eighth set of instructions, executable on said computer system, configured to detach said second plex from said log; and
a ninth set of instructions, executable on said computer system, configured to attach said first plex to said log in response to said second plex being detached from said log.

19. An apparatus comprising:
hardware means for attaching a first plex to a log, wherein said log comprises a log plex, said log is a storage replicator log (SRL);
hardware means for writing a checkpoint start to said log plex and to said first plex;
hardware means for writing first data to said log plex;
hardware means for writing said first data to said first plex, wherein writing said first data to said log plex and writing said first data to said first plex are performed concurrently;
hardware means for writing a checkpoint end to said log plex and to said first plex;
hardware means for detaching said first plex from said log;
hardware means for writing second data to said log plex, wherein
said hardware means for writing said second data is configured to write said second data to said log plex after said hardware means for detaching detaches said first plex from said log; and
hardware means for backing up data stored between said checkpoint start and said checkpoint end in said first plex.

20. The apparatus of claim 19, wherein said hardware means for attaching is configured to attach said first plex to said log in a mode that does not cause a resynchronization operation to be performed on said first plex.

21. The apparatus of claim 19, wherein said hardware means for writing said data is configured to write only a selected portion of said data to said first plex.

22. The apparatus of claim 19, further comprising:
hardware means for attaching a second plex to said log in response to said first plex being detached from said log, wherein
said hardware means for writing said second data to said log plex is further configured to write said second data to said second plex, wherein
said hardware means for writing said second data is configured to write said second data to said second plex concurrently with writing said second data to said log plex.

23. The apparatus of claim 22, further comprising:
hardware means for detaching said second plex from said log; and
hardware means for attaching said first plex to said log in response to said second plex being detached from said log.

* * * * *